United States Patent [19]
Krasner

[11] Patent Number: 6,107,960
[45] Date of Patent: Aug. 22, 2000

[54] REDUCING CROSS-INTERFERENCE IN A COMBINED GPS RECEIVER AND COMMUNICATION SYSTEM

[75] Inventor: Norman F. Krasner, San Carlos, Calif.

[73] Assignee: SnapTrack, Inc., San Jose, Calif.

[21] Appl. No.: 09/008,961

[22] Filed: Jan. 20, 1998

[51] Int. Cl.[7] .............................. H04B 7/185; G01S 5/02
[52] U.S. Cl. ................................ 342/357.09; 342/357.1; 455/194.1
[58] Field of Search ......................... 342/357.09, 357.1; 455/79, 82, 174.1, 194.1; 375/217

[56] References Cited

U.S. PATENT DOCUMENTS

| | | | |
|---|---|---|---|
| 4,216,432 | 8/1980 | Imazeki et al. | 455/79 |
| 4,378,603 | 3/1983 | Eastmond | 455/79 |
| 4,445,118 | 4/1984 | Taylor et al. | . |
| 4,853,972 | 8/1989 | Ueda et al. | 455/83 |
| 4,920,285 | 4/1990 | Clark et al. | 307/571 |
| 5,043,736 | 8/1991 | Darnell et al. | . |
| 5,223,844 | 6/1993 | Mansell et al. | . |
| 5,225,842 | 7/1993 | Brown, et al. | . |
| 5,365,450 | 11/1994 | Schuchman et al. | . |
| 5,504,482 | 4/1996 | Schreder | 340/995 |
| 5,512,902 | 4/1996 | Guthrie et al. | 342/357 |
| 5,512,908 | 4/1996 | Herrick | 342/387 |
| 5,647,379 | 7/1997 | Meltzer | 128/897 |
| 5,650,770 | 7/1997 | Schlager et al. | . |
| 5,918,183 | 6/1999 | Janky et al. | 455/550 |

FOREIGN PATENT DOCUMENTS

| | | |
|---|---|---|
| 0242099 | 6/1987 | European Pat. Off. . |
| WO891283 | 12/1989 | European Pat. Off. . |
| WO9714056 | 4/1997 | WIPO .............................. G01S 5/14 |

OTHER PUBLICATIONS

Bryant D. Elrod and A.J. Van Dierendonck, Testing and Evaluation of GPS augmented with Pseudolites for Precision Approach Applications, 2nd International Conference on Differential Satellite Navigation Systems (DSNS 1993), 8 pages.

T.A. Stansell, Jr., RTCM SC–104 Recommended Pseudolite Signal Specification, Global Positioning System, vol. III, The Institute of Navigation (1986) pp. 117–134.

F.H. Raab, et al., An Application of the Global Positioning System to Search and Rescue and Remote Tracking, Navigation: Journal of the Institute of Navigation, vol. 24, No. 3 (Fall 1997), pp. 216–228.

*Primary Examiner*—Theodore M. Blum
*Attorney, Agent, or Firm*—Blakely, Sokoloff, Taylor & Zafman

[57] ABSTRACT

A method and apparatus is disclosed for reducing cross-interference in a combined satellite positioning system receiver and communication transceiver device. A control signal is transmitted from the communication transceiver to the satellite positioning system receiver when the communication transceiver transmits data at a high power level over a communication link. The control signal causes satellite positioning system signals from satellites to be blocked from the receiving circuits of the satellite positioning system receiver, or to be disregarded by the processing circuits of the satellite positioning system receiver.

20 Claims, 4 Drawing Sheets

REDUCING CROSS-INTERFERENCE IN A COMBINED GPS RECEIVER AND COMMUNICATION SYSTEM

FIELD OF THE INVENTION

The present invention relates generally to the field of satellite positioning system (SPS) receivers, and more particularly to reducing cross-interference in a combined SPS receiver and communication system.

BACKGROUND OF THE INVENTION

The use of portable personal communication devices, such as cellular phones and pagers, has increased dramatically in recent years. Additionally, the use of portable navigational devices, such as Satellite Positioning System (SPS) receivers, has increased as these devices have become more widely available. Recent technological developments have allowed the combination of SPS receivers and communication systems in integrated units, such as a combination SPS receiver and cellular phone unit. Such combined devices have many applications such as personal security, emergency response, vehicle tracking, and inventory control. Some combination units combine separate SPS receivers and communication systems using suitable electronic interfaces. Others use shared circuitry and packaging. These combined units feature the convenience advantages afforded by common housings and integrated user interfaces. However, such combined units may also exhibit certain shortcomings, such as increased power consumption and reduced performance.

One marked disadvantage inherent in many combined SPS and communication devices is the decreased performance of the SPS receiver section of the combined unit. A common cause for this decreased performance is signal interference between the communication and SPS receiver stages. For example, in a combination cellular phone/SPS receiver, a cellular transmissions from the cellular telephone stage generate strong interference which can reduce the performance of the GPS receiver.

Current approaches to overcoming the cross-interference between the communication and SPS stages involve the use of complicated filters or high dynamic range circuits in the front-end section of the SPS receiver to limit the in-band interference to acceptable ranges. These approaches, however, require the use of complex additional circuitry which can increase the cost and power consumption of the combined unit. For example, one method of reducing the cross-coupling in a combination cell phone/SPS receiver is to use several bandpass filters in the RF front end of the SPS transmitter to eliminate the radio frequency (RF) interference from the cellular transmitter. However, there are several problems with this approach. First, several filters may be required to provide adequate reduction of the signal energy coupled into the SPS receiver RF circuitry from the cellular transmitter. This may increase cost and size of the combined unit. Secondly, the use of filters increases the noise figure of the SPS receiver, making it less sensitive to the satellite navigational signals.

It is therefore desirable to provide a system that reduces the cross-interference between the SPS and communication sections of a combined SPS/communication receiver.

It is further desirable to provide a system that improves the SPS reception performance in a combined SPS/communication receiver without adversely impacting the cost and sensitivity characteristics of the SPS receiver.

SUMMARY OF THE INVENTION

A method and apparatus for reducing cross-interference in a combined Satellite Positioning System (SPS) receiver and communication device is disclosed. In an embodiment of the present invention, the SPS receiver is contained in an combined mobile unit which also includes a cell-based communication transmitter/receiver. The communication section transmits a gating signal to the SPS receiver when the communication section is in transmit mode. The gating signal causes the SPS receiver to block received satellite signals from its front-end processing circuitry when the cellular telephone is transmitting.

In an alternative embodiment of the present invention, the SPS receiver receives the satellite signals, but the gating signal from the communication section causes the SPS processing circuitry to disregard these received signals during periods of time in which the cellular telephone is transmitting.

Other features of the present invention will be apparent from the accompanying drawings and from the detailed description which follows.

BRIEF DESCRIPTION OF THE DRAWINGS

The present invention is illustrated by way of example and not by way of limitation in the figures of the accompanying drawings in which references indicate similar elements and in which.

DETAILED DESCRIPTION

A method and apparatus for reducing cross-interference in a combined Satellite Positioning System (SPS) receiver and communication device is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form to facilitate explanation.

In the following discussion, embodiments of the present invention will be described with reference to application in the United States Global Positioning Satellite (GPS) system. It should be evident, however, that these methods are equally applicable to similar satellite positioning systems, such as the Russian Glonass system. Thus, the term "GPS" used herein includes such alternative satellite positioning systems, including the Russian Glonass system. Likewise, the term "GPS signals" includes signals from alternative satellite positioning systems.

Combined GPS/Communication Receiver

Figure 1:
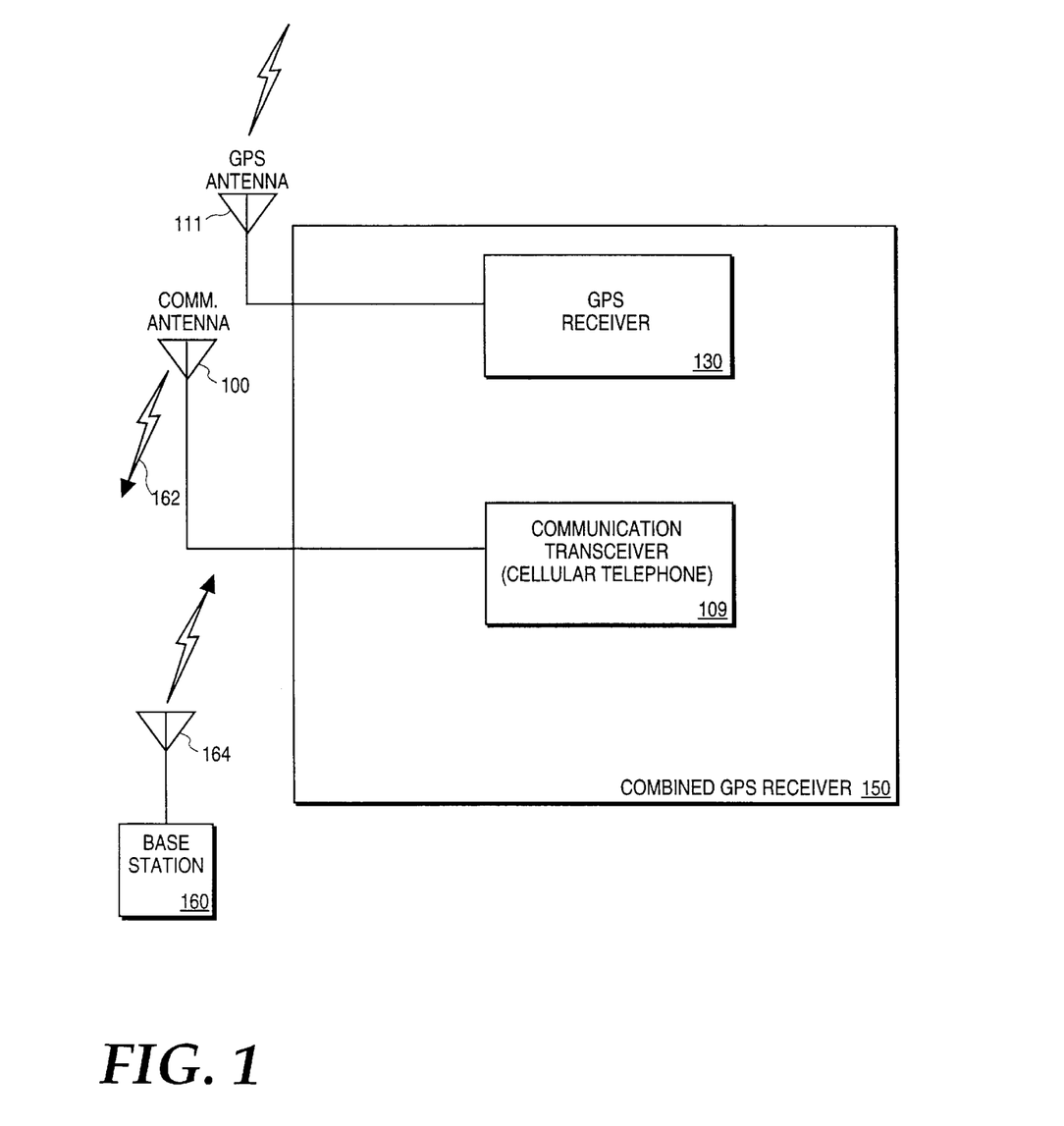
FIG. 1 is a block diagram of a combined GPS receiver and communication system with a communication link to a basestation according to one embodiment of the present invention.

FIG. 1 is a block diagram of a GPS receiver which combines a communication transmitter/receiver (transceiver) with a GPS receiver for use in one embodiment of the present invention. In one embodiment, combined GPS/communication receiver 150 is a portable hand-held (mobile) unit 150 that includes circuitry for performing the functions required for processing GPS signals as well as the functions required for processing communication signals transmitted and received through a communication link. The communication link, such as communication link 162, is typically a radio frequency communication link to another communication component, such as a basestation 160 having a communication antenna 164.

Combined GPS receiver 150 contains a GPS receiver 130 including an acquisition circuit and a processing section. In accordance with traditional GPS methods, GPS receiver 130 receives GPS signals transmitted from orbiting GPS satellites and determines the times-of-arrival of unique pseudorandom noise (PN) codes by comparing the time shifts between the received PN code signal sequences and internally generated PN signal sequences. GPS signals are received through GPS antenna 111 and input to an acquisition circuit which acquires the PN codes for the various received satellites. The navigational data (e.g., pseudorange data) produced by the acquisition circuit are processed by a processor for transmission by communication transceiver 109.

Combined GPS receiver 150 also includes communication transceiver section 109. Communication transceiver 109 is coupled to communication antenna 100. Communication transceiver 109 transmits navigational data processed by GPS receiver 130 through communication signals (typically RF) to a remote basestation, such as basestation 160. The navigational data may be the actual latitude, longitude, and altitude of the GPS receiver, or it may be raw or partially processed data. Received communication signals are input to communication transceiver 109 and passed to a processor for processing and possible output through an audio speaker.

According to one embodiment of the present invention, in the combined GPS/communication 150, pseudorange data generated by GPS receiver 130 is transmitted over communication link 162 to basestation 160. Basestation 160 then determines the location of combined receiver 150 based on the pseudorange data from the combined receiver, the time at which the pseudoranges were measured, and ephemeris data received from its own GPS receiver or other sources of such data. The location data can then be transmitted back to combined GPS/communication receiver 150 or to other remote locations. The communication link 162 between combined GPS receiver 150 and basestation 160 may be implemented in a number of various embodiments including a direct link or cellular telephone link. In one embodiment of the present invention, the communication transceiver section 109 is implemented as a cellular telephone.

Figure 2:
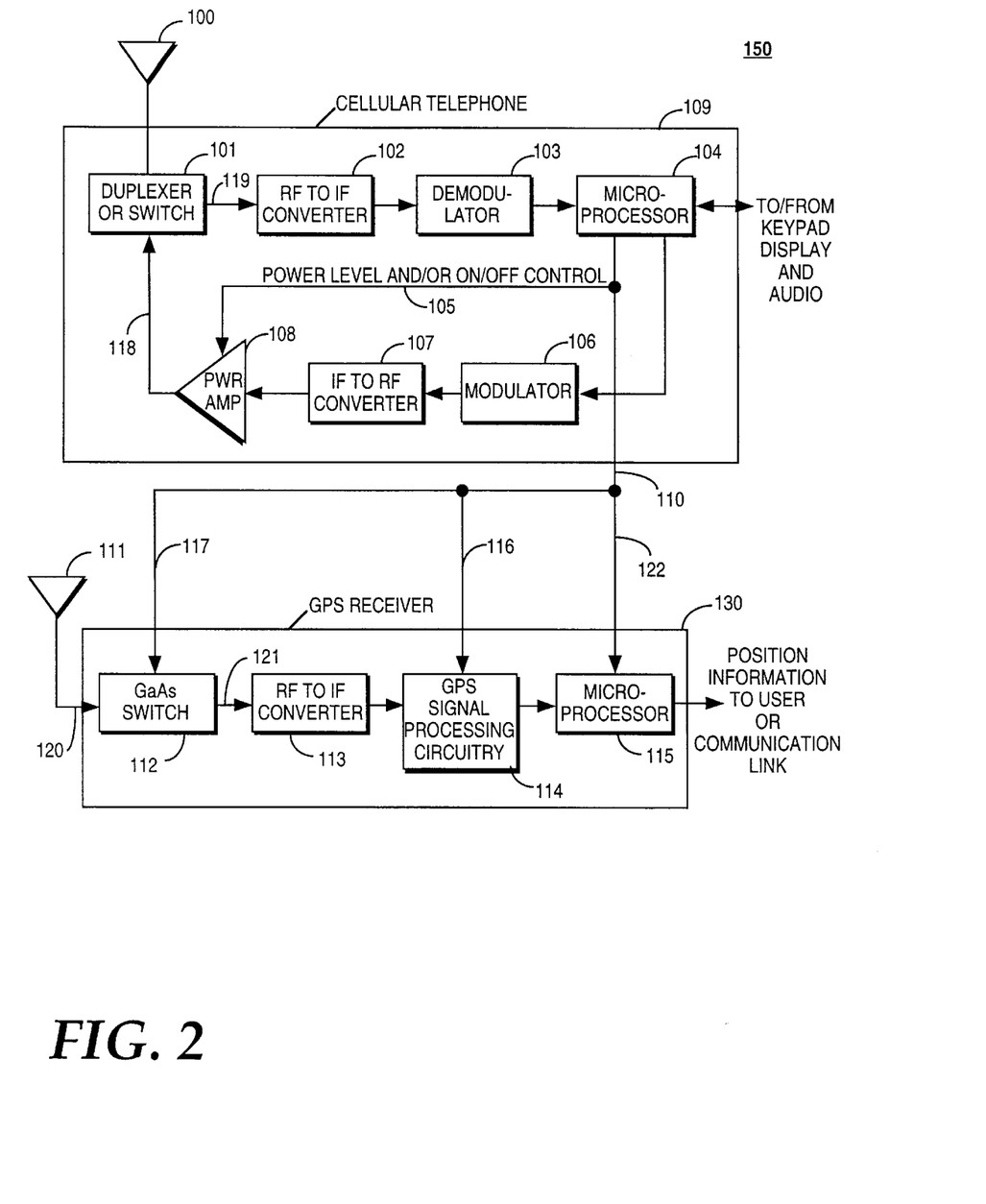
FIG. 2 is a block diagram of the components comprising the GPS receiver and communication transceiver in a combined GPS/communication receiver according to an embodiment of the present invention.

FIG. 2 provides a more detailed block diagram of a combined cellular telephone and GPS receiver according to one embodiment of the present invention. It will be appreciated by those of ordinary skill in the art that the system illustrated in FIG. 2 is one embodiment, and that many variations in the design and construction of a combined GPS receiver in accordance with the teaching of the present invention are possible. For example, although the following discussion will assume that the communication section is embodied in a cellular telephone, it will be appreciated that the present invention may be embodied in other communication devices, such as two-way pagers, and similar bi-directional communicators.

In FIG. 2, combined GPS receiver 150 comprises GPS receiver 130 and GPS antenna 111 (together referred to as the "GPS section"), and cellular telephone 109 and cell phone antenna 100 (together referred to as the "communication section"). The cellular telephone transmits and receives signals via antenna 100 to and from a remote base station (e.g., base station 160 in FIG. 1).

GPS Section

In the GPS receiver 130 of the combined receiver 150, a received GPS signal is input from GPS antenna 111 through signal line 120 and switch 112 to a radio frequency (RF) to intermediate frequency (IF) converter 113. Frequency converter 113 translates the signal to a suitable intermediate frequency, for example 70 MHz. It then provides a further translation to a lower intermediate frequency, for example 1 MHz. The output of the RF to IF converter 113 is coupled to the input of GPS signal processing circuit 114. GPS signal processing circuitry 114 includes an analog to digital (A/D) converter which digitizes the output signals from the RF to IF converter 113.

In one embodiment of the present invention, GPS signal processing circuit 114 also includes a digital snapshot memory which is coupled to the output of the A/D converter and which can store a record of the data to be processed. The snapshot memory is used to process the GPS signals which are typically stored in a separate memory device coupled to GPS processing circuitry 114. The snapshot memory can also be employed for communication signals that are packetized, that is, signals consisting of bursts of data bits followed by long periods of inactivity. Continuous signaling, such as many cellular-type signals, may also be processed in a continuous manner by the processing circuitry.

The output from GPS signal processing circuitry 114 is coupled to microprocessor 115. Microprocessor 115 further processes the satellite signals received in GPS receiver 130 and outputs the processed signals for transmission directly to a user interface or through a communication link to a remote receiver (not shown).

In one embodiment of the present invention, the GPS receiver 130 is a conventional GPS receiver that uses a set of correlators to demodulate the GPS signals. In a method of the present invention, a gating signal deactivates the GPS receiver for a small fraction of the time. Under normal circumstances, a conventional GPS receiver can perform all of its normal functions, including demodulation of the 50 baud satellite data message, despite this deactivation time. However, if the gating periods become a large fraction of the data baud period, then demodulation may be difficult or impossible. In this case, an alternative type of GPS receiver may be used. For example, one type of GPS receiver only finds the relative times of arrival of the multiple simultaneously received GPS signals, and transmits these relative times of arrival (so-called "pseudoranges") to a remote location (see, for example, F. H. Raab, et al., "An Application of the Global Positioning System to Search and Rescue and Remote Tracking", Journal of the Institute of Navigation, Vol. 24, No. 3, Fall 1977, pp. 216–227). The position of the mobile unit is then determined by combining this pseudorange data with the GPS satellite information which it gathers using its own receivers or via some other source of such data. This configuration is especially useful in various emergency response and tracking applications.

Although embodiments of the present application are discussed with regard to a particular GPS receiver configuration, it will be apparent to those of ordinary skill in the art, that several different GPS receiver configurations exist which may take advantage of the cross-interference reduction methods of the present invention.

Furthermore, although embodiments of the present invention are described with reference to GPS satellites, it will be appreciated that the teachings are equally applicable to positioning systems which utilize pseudolites or a combination of satellites and pseudolites. Pseudolites are ground based transmitters which broadcast a PN code (similar to a GPS signal) modulated on an L-band (or other frequency) carrier signal, generally synchronized with GPS time. Each transmitter may be assigned a unique PN code so as to permit identification by a remote receiver. Pseudolites are useful in situations where GPS signals from an orbiting satellite might by unavailable, such as tunnels, mines, buildings or other enclosed areas. The term "satellite", as used herein, is intended to include pseudolites or equivalents of pseudolites, and the term GPS signals, as used herein, is intended to include GPS-like signals from pseudolites or equivalents of pseudolites.

Communication Section

The communication section of the combined GPS/communication receiver 150 includes a receiver stage and a transmitter stage coupled to communication antenna 100 through a duplexer or transmit/receive switch 101. When a communication signal, such as a cellular telephone signal, is received from a communication basestation (e.g., basestation 160), switch 101 routes the input signal to RF to IF converter 102. The RF to IF frequency converter 102 translates the communication signal to a suitable intermediate frequency for further processing. The output of the RF to IF converter 102 is coupled to demodulator 103 which demodulates the communication signal in order to determine the commands in the communication signal or other data in the communication signal (e.g., Doppler data or data representative of ephemeris of satellites in view). Demodulator 103 may be implemented as a digital demodulator. In this case, prior to input to demodulator 103, the frequency converted communication signal may be passed through an analog to digital (A/D) converter which digitizes the output signals from the RF to IF converter 102.

In one embodiment of the present invention, output from demodulator 103 is passed to microprocessor 104. Microprocessor 104 performs any processing required for the communication receive and transmit functions. When a transmission is required through the communication link, microprocessor 104 generates the data to be transmitted and baseband digital samples of the signal. It then uses this data to modulate a carrier signal using modulator 106. Although analog modulation (such as frequency modulation) may also be used, in the latest systems, modulation is generally of a digital type, such as frequency shift keying or phase shift keying. In this case, the modulated signal is converted from digital to analog in a D/A converter after modulation. The carrier frequency at which the modulation is performed in modulator 106 may or may not be at the final RF frequency of the communication signal; if it is at an intermediate frequency (IF), then an additional IF to RF converter 107 is used to translate the signal to a final RF frequency for the communication signal. A power amplifier 108 boosts the signal level of the communication signal, and this boosted signal is then transmitted to the communication antenna 100 through switch 101.

In a method of the present invention, a communication signal containing data representative of position information (e.g., pseudoranges to various satellites, or a latitude and longitude of the combined GPS/communication receiver 150) is transmitted to basestation 160, through communication link 162. Basestation 160 may serve as a processing site for computing the position information of the portable GPS unit, or it may serve as a relay site and re-transmit the information received from the portable GPS unit 150.

In some cellular telephone systems, such as Time-Division Multiple Access (TDMA) systems (including, for example, GSM, the Global System for Mobile Communications), the transmission and reception times of the cellular signals are disjoint. In those cases, a simple switch 101 may be used to isolate the strong transmitted signal 118 provided by power amplifier 108 from the path 119 connected to the sensitive front-end receiving circuitry (frequency converter 102). In particular, the receiving circuitry 102 may contain a low noise amplifier (LNA) which may be destroyed or otherwise adversely affected if the signal from the power amplifier is transmitted to the LNA without significant attenuation.

In other cellular systems, such as IS-95 North American based on Code Division Multiple Access (CDMA), there may be simultaneous transmission and reception of signals through the antenna 100. In order to isolate the RF circuitry of 102 from the high powered signal of 118 a device termed a "duplexer" is used instead of switch 101. Duplexer 101 consists of two RF filters, one tuned to the transmission band of frequencies and the other to the received band. The power amplifier output 118 is passed through the transmission filter and then to antenna 100, while the received signal from the antenna is passed through the receive filter. Thus, the transmissions are isolated from the RF circuitry 102 by an amount equal to the isolation that the receive filter provides at the transmission frequency.

GPS Signal Gating

In one embodiment of the present invention, combined GPS/communication receiver 150 includes control circuitry which reduces cross interference between the GPS receiver and cellular transceiver stages. In combined receivers, cross-interference is often an especially acute problem since satellite signals received in the GPS receiver are typically very weak. Cross-interference typically occurs due to a high degree of coupling between the transmitted cellular telephone signal through antenna 100 and the GPS receiving antenna 111. This is especially true in the case where the antenna units 100 and 111 are collocated or share portions of their mechanical assembly in order to conserve physical space or reduce cost.

In one embodiment of the present invention, cross-interference between the communication and GPS sections of the combined unit is reduced by lowering the power to the transmitter of the communication section (typically a cellular telephone). A gating signal synchronizes the power control and GPS receiver operation. Reference is made to combined receiver of FIG. 2 for a description of the operation of a gating signal according to one embodiment of the present invention.

In the cellular telephone section 109 of the combined GPS/communication receiver 150, a power level control signal 105 is transmitted from microprocessor 104 to power amplifier 108. In one embodiment of the present invention, a first state of the power level control signal reduces power in the power amplifier, and a second state of the signal restores normal power levels in the power amplifier. Alternatively, two signals are embodied within the power level control signal. A first signal reduces power in the power amplifier, and a second signal restores normal power levels in the power amplifier. Depending on the power level of amplifier 108 and the desired reduction in cross-interference, the power level control signal 105 can turn-off power amplifier 108 completely, or reduce its amplification power by a pre-determined amount.

The power level control signal 105 is also transmitted to the GPS receiver 130. This signal is programmed to activate the GPS receiver to receive and process GPS signals in relation to the power level of the communication power amplifier 108. When the power level control signal 105 reduces or cuts power to power amplifier 108, the GPS receiver 130 is activated to receive GPS signals. Conversely, when the power level control signal maintains normal power levels in power amplifier 108, the GPS receiver 130 is prevented from receiving GPS signals. Alternatively, the GPS receiver 130 may be programmed receive GPS signals but ignore such signals in its processing circuitry when the power level control signal indicates that the cellular telephone transmitter is at full power.

In GPS receiver 130, gating signal 110 corresponds to power level control signal 105. In one embodiment of the present invention, gating signal 110 is transmitted to microprocessor 115 through line 122, and to GPS processing circuit 114 through line 116, and to switch 112 through line 117. In one embodiment, switch 112 is controlled by gating signal 110 and power level control signal 105. When the power level control signal 105 reduces power to the cellular telephone power amplifier 108, switch 112 is turned on to allow data to pass from GPS antenna 111 to the GPS receiver circuits. Conversely, when the power level control 105 signal maintains high power to the power amplifier 108, switch 112 is turned to off so that no data is passed through to the GPS receiver. Thus, GPS signals are gated out (or blocked) during cellular telephone transmissions at high power, while they may be received at all other times.

In one embodiment of the present invention, switch 112 is a Gallium Arsenide (GaAs) switch. Because switch 112 is in the GPS input signal path, it will cause some attenuation of the input GPS signal. Use of a GaAs switch minimizes this attenuation. Moreover, current switch devices at the GPS frequency (1575.42 MHz) provide an insertion loss of about 0.5 dB.

In an alternative embodiment of the present invention, gating signal 110 may be input only to the microprocessor 115 instead of switch 117. In this configuration, microprocessor 115 directly controls switch 117 or GPS signal processing circuit 114 to gate the incoming GPS signals when the cellular telephone 109 is transmitting.

In a further alternative embodiment of the present invention, the GPS receiver 130 may not include GaAs switch 112. This switch may be omitted if the RF front end circuitry of the GPS receiver 113 can withstand the high power from the cellular telephone transmitter (e.g., with some type of limiting circuitry). Omission of switch 112 eliminates any potential signal attenuation through the switch. In this alternative embodiment, gating signal 110 is input to either or both GPS signal processing circuit 114 and microprocessor 115. This signal causes the input GPS signals to be disregarded by the processing circuitry during periods in which the cellular telephone is transmitting, even though these signals are received by GPS receiver 130.

Most modern digital cellular telephone systems have the ability to transmit at full power only a fraction of the time. Thus, the gating signal method described herein is applicable to a wide variety of digital cellular telephones. If cellular transmissions in these phones occur with a ⅛ duty cycle (as is the case of GSM digital cellular, or CDMA in reduced data throughput mode), then the loss in sensitivity of the GPS receiver due to such gating is only approximately 0.5 dB.

Figure 4:
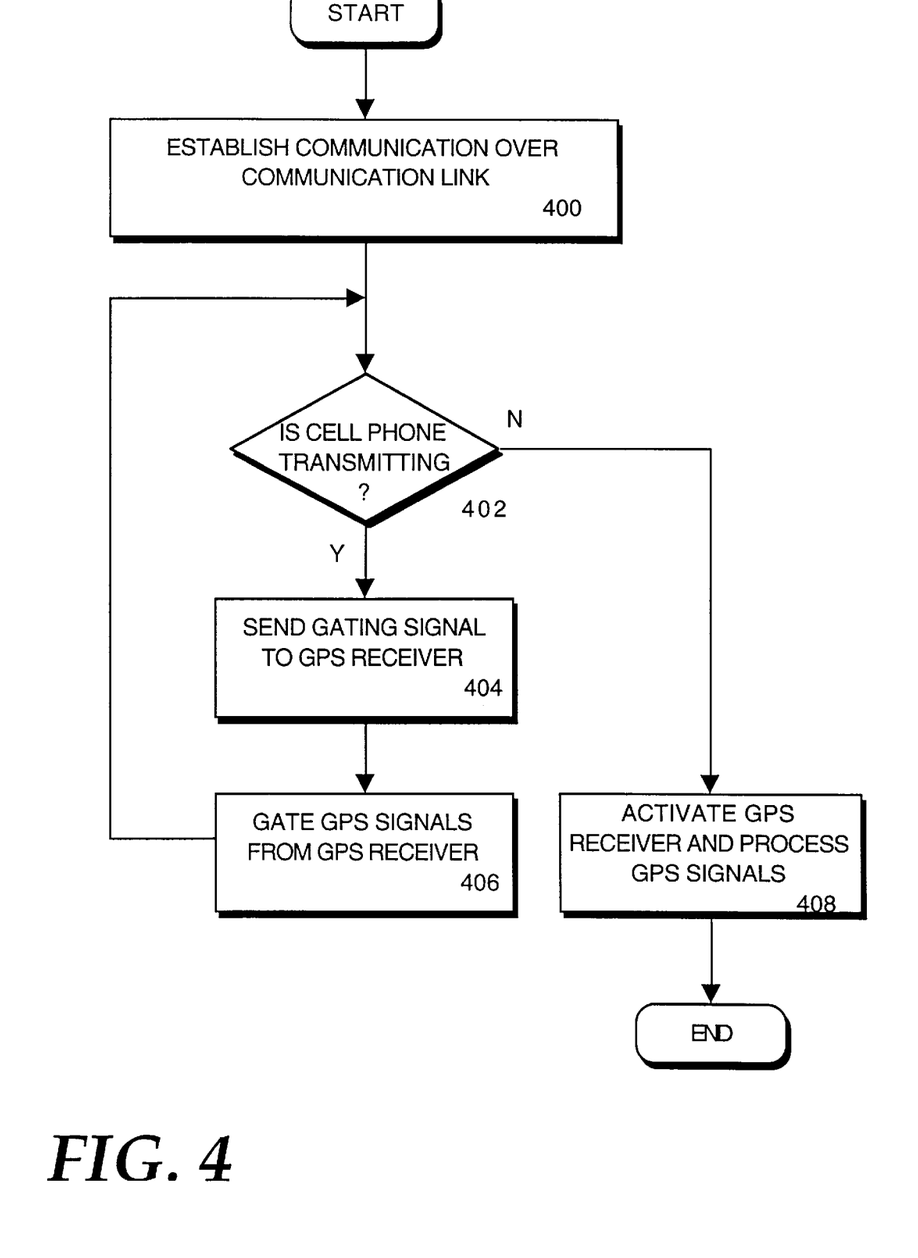
FIG. 4 is a flow chart illustrating the steps of reducing cross-interference in a combined GPS/communication receiver according to a method of the present invention.

FIG. 4 is a flowchart illustrating the steps of reducing cross interference in a combined GPS/communication receiver according to a method of the present invention. The combined GPS/communication receiver 150 first establishes a communication with the GPS basestation 160 over the wireless communication link, step 400. It is assumed that the combined GPS/communication receiver is in position to receive satellite signals from various satellites in view. During possible reception of GPS signals, it is determined whether the cellular telephone is transmitting, step 402. If the cellular telephone is in transmission mode, a gating signal is sent to the GPS receiver, step 404. As stated above, the gating signal could be used to control a switch which gates out GPS signals from the receiver front-end, or the gating signal could be used to cause the GPS processor to ignore any received GPS signals, step 406. GPS signals are gated or ignored by the GPS receiver until it is determined in step 402 that the cellular telephone is no longer in transmission mode. When the cellular telephone is not transmitting, the GPS receiver is activated and proceeds to process received GPS signals, step 408.

In the combined GPS/communication receiver 150 of FIG. 2, circuits within the GPS section and communication section were illustrated as dedicated and separate between the two sections. It is to be noted however, that embodiments of the present invention may be used in combination GPS/communication receivers in which one or more elements are shared between the two sections. For example, the functions of microprocessor 104 and 115 may be combined into a single processor or programmable digital circuit which may be shared between the GPS and communication sections. Likewise, one or more of the frequency converters, switches, or antenna units may be shared between the two sections.

Cellular Telephone/GPS Network

Figure 3:
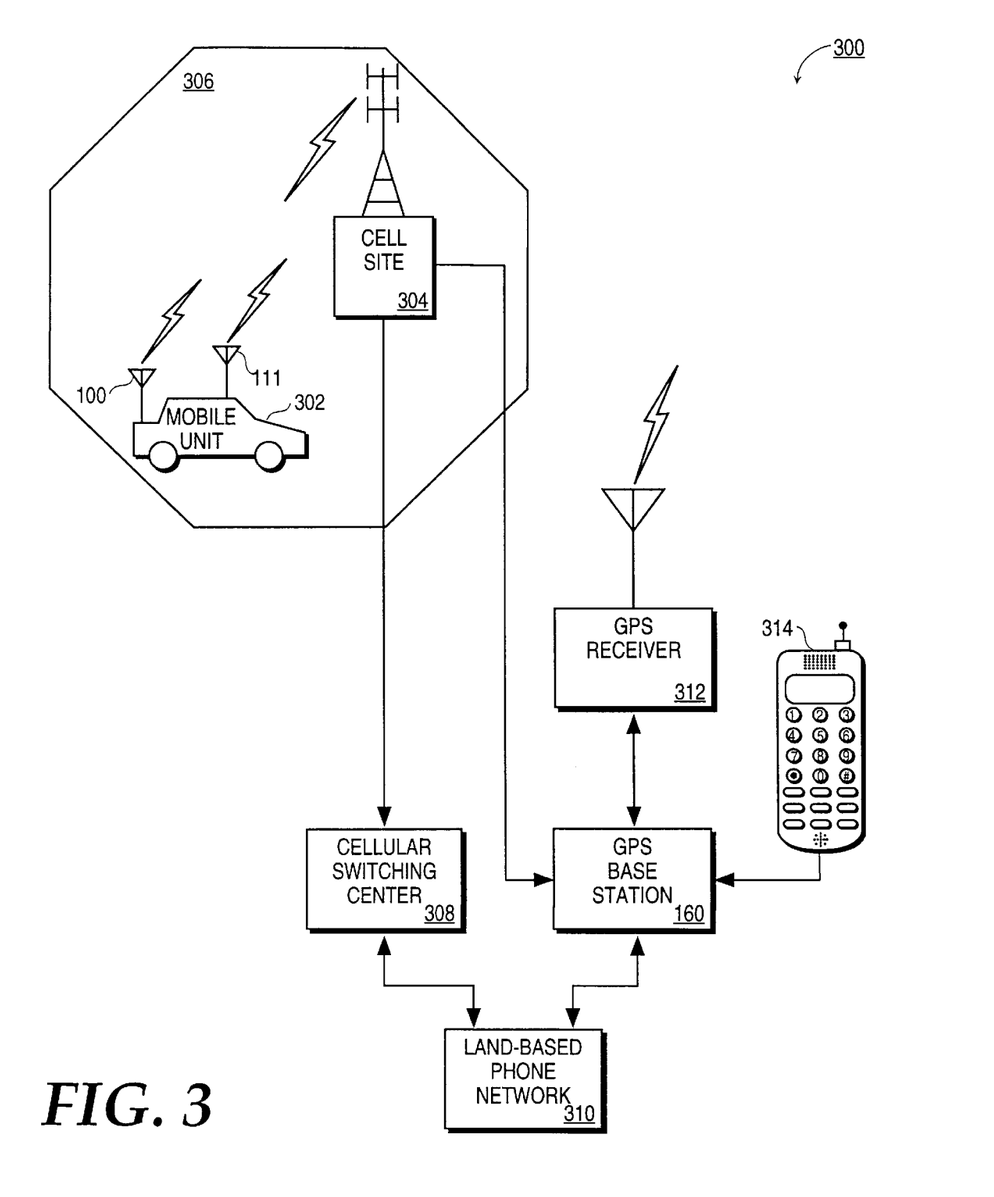
FIG. 3 illustrates a combined GPS/communication receiver used in a cellular telephone network according to one embodiment of the present invention.

As described above, one embodiment of the present invention is used in a combined GPS/communication receiver in which the communication transceiver is a cellular telephone used in a cellular network. FIG. 3 illustrates the use of combined GPS/communication receiver 150 in the context of a cellular telephone network to form a combined GPS and cellular system 300. Area 306 represents a cellular telephone cell which is served by cell site 304. Cell site 304 transmits and receives cellular telephone signals to and from cellular phones and receivers, such as mobile unit 302, within cell 306. Mobile unit 302 contains a combined GPS/communication receiver, such as combined unit 150 in FIG. 1. Mobile unit 302 communicates cellular signals to cell site 304 through communication antenna 100, and receives GPS signals from GPS satellites through GPS antenna 111. Cell site 304 transmits cellular transmissions from mobile units within cell 306 to a land-based phone network 310 through cellular switching center 308. Cellular switching center 308 transmits communication signals received from mobile unit 302 to the appropriate destination. Cellular switching center 308 may service several other cells in addition to cell 306. If the destination of the signal transmitted by mobile unit 302 is another mobile unit, a connection is made to the cell site that covers the area in which the called mobile unit is located. If the destination is land-based, cellular switching center 308 connects to land-based phone network 310.

It should be noted that a cellular based communication system is a communication system which has more than one transmitter, each of which serves a different geographical area, which is predefined at any instant in time. Typically, each transmitter is a wireless transmitter which serves a cell which has a geographical radius of less than 20 miles, although the area covered depends on the particular cellular system. There are numerous types of cellular communication systems, such as cellular telephones, PCS (personal communication system), SMR (specialized mobile radio), one-way and two-way pager systems, RAM, ARDIS, and wireless packet data systems. Typically the predefined different geographical areas are referred to as cells and a number of cells are grouped together into a cellular service area, and these number of cells are coupled to one or more cellular switching centers which provide connections to land based telephone systems and/or networks. Service areas are often used for billing purposes. Hence, it may be the case that cells in more than one service area are connected to one switching center. Alternatively, it is sometimes the case that cells within one service area are connected to different switching centers, especially in dense population areas. In general, a service area is defined as a collection of cells within close geographical proximity to one another. Another class of cellular systems that fits the above description is satellite based, wherein the cellular basestations are satellites that typically orbit the earth. In these systems, the cell sectors and service areas move as a function of time. Examples of such systems include the Iridium, Globalstar, Orbcomm and Odyssey systems.

In the system illustrated in FIG. 3, the GPS position information transmitted by mobile unit 302 is transmitted to GPS server basestation 160 through land-based phone network 310. GPS basestation 160 serves as the processing site for computing the position of the GPS receiver in remote unit 302. GPS basestation 160 may also receive GPS information from satellite signals received in GPS receiver 312 (for example, to provide differential corrections to the mobile GPS information). GPS basestation 160 may be directly linked to cell site 304 through a land-line or radio link to receive the corresponding cellular communication signals. Alternatively, GPS basestation 160 may receive the corresponding cellular communication signals from a cellular phone 314 which transmits signals to a cellular receiver in GPS basestation 160.

It should be noted, that the cellular network system 300 of FIG. 3 represents one embodiment of the utilization of the present invention, and that other communication systems other than a cellular telephone network, may be used to transmit GPS signals from a mobile unit to a GPS basestation.

Cellular Communication Systems

Embodiments of the present invention may be used in several different cellular telephone systems. The specific cellular system or standard depends upon the region in which the system is deployed since cellular standards vary among different countries and regions.

In one embodiment of the present invention, the combination GPS/communication receiver 150 is used in the GSM cellular system. GSM is a Pan-European digital cellular system utilizes Time Division Multiple Access (TDMA) methods. When transmitting voice information, the handset sends a burst of data during a timeslot equal to 15/26 milliseconds. There are eight timeslots per TDMA frame and the handset only transmits during one of these frames. Hence, the transmitter is activated only 12.5% of the time. Accordingly the control line for this system (i.e., gating signal 110 in FIG. 2) will indicate an active transmission 12.5% of the time. This causes the GPS receiver 130 to gate out and/or ignore the input GPS data for this period of time. The "off" periods are very short, less than one GPS code period (977.5 microseconds) and only about 1/20 the duration of a GPS data bit. The effective sensitivity loss is a factor of 0.875 or −0.58 dB.

Another embodiment of the present invention may be used in the IS-136 North American TDMA system. The IS-136 system uses six time slots per 40 millisecond frame period. For full rate signaling, a voice traffic channel occupies two such slots, or 13.33 milliseconds. For half-rate signaling, a voice traffic channel occupies one time slot or 6.66 milliseconds. Hence, for full rate signaling it may not always be practical to receive a GPS data message; however, synchronization to the GPS PN epochs (for determining the so-called "pseudoranges") may still be performed. The resulting sensitivity loss is 0.667 or −1.76 dB in this case. If half-rate signaling is used, the resulting sensitivity loss is reduced to 0.833 or −0.76 dB.

A further embodiment of the present invention may be used in the IS-95 North American Code Division Multiple Access (CDMA) system. In the IS-95 system, signals are prevented from interfering with one another by each using a different spread spectrum spreading code. Data is organized in 20 millisecond frames. However, when transmitting signals at low data rates (e.g., non-continuous speech), the data is transmitted in bursts that only occupy a portion of the frame. For example, at 1200 baud, the data bursts only occupy 1/8 of a frame, and during the remainder of the frame the transmitted signal is sent at reduced power levels. During these times of reduced emissions, the GPS receiver 130 can be activated. Likewise, during periods of normal transmission, the GPS receiver 130 can be deactivated, that is, the receiver front-end is switched off and/or the input GPS data is ignored by the processing circuitry. The effective sensitivity loss to the GPS receiver for the 1200 baud transmission case is equivalent to a reduction in integration time to 7/8 that is otherwise possible, which is equivalent to −0.58 dB. For this 1200 baud case the times of transmission the data burst periods are only 1.25 milliseconds, which is a small fraction of a GPS data bit (20 milliseconds). Thus, a conventional GPS receiver can still demodulate satellite data messages in the presence of the gating signal 110.

In the foregoing, a system has been described for reducing cross-interference in a combined GPS receiver and communication transceiver unit. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than restrictive sense.

What is claimed is:

1. A method for reducing interference in a satellite positioning system receiver, said satellite positioning system receiver receiving satellite positioning system signals from a plurality of satellite positioning system satellites, said method comprising:

establishing a communication link through a communication unit coupled to said satellite positioning system receiver, said communication unit operable to transmit data over said communication link; and transmitting a control signal to said satellite positioning system receiver from said communication unit upon occurrence of a first condition, said control signal operable to disable processing of satellite positioning signals incident to said satellite positioning system receiver, said first condition comprising transmission of data from said communication unit over said communication link.

2. The method of claim 1 further comprising transmitting said control signal from a communication processor in said communication unit to an output amplifier in said communication unit, said output amplifier operable to control transmission power from said communication unit.

3. The method of claim 2 wherein said control signal comprises a first state and a second state, said first state operable to maintain power in said output amplifier above a threshold, said second state operable to reduce power in said output amplifier below said threshold, and wherein said first state indicates the occurrence of said first condition.

4. The method of claim 2 wherein said control signal comprises a first signal and a second signal, said first signal operable to maintain power in said output amplifier above a threshold, said second signal operable to reduce power in said output amplifier below said threshold, and wherein said first signal indicates the occurrence of said first condition.

5. The method of claim 3 further comprising transmitting said control signal from said communication processor to a switch in said satellite positioning system receiver, said switch being coupled between a satellite positioning system receiver antenna and a receiver circuit in said satellite positioning system receiver, and wherein said control signal disables said processing of said satellite positioning signals by opening said switch to thereby block reception of said satellite positioning signals from said receiver circuit.

6. The method of claim 3 further comprising transmitting said control signal from said communication processor to a satellite positioning system processor in said satellite positioning system receiver, and wherein said control signal disables said processing of said satellite positioning signals by causing said satellite positioning system processor to disregard satellite positioning system signals received by a receiver circuit in said satellite positioning system receiver.

7. The method of claim 5 wherein said switch is a Gallium Arsenide switch.

8. The method of claim 2 wherein said communication unit is a cell based transceiver, and said communication signal is a cellular telephone signal.

9. The method of claim 8 wherein said satellite positioning signals include navigational data specifying at least one pseudo-range for a corresponding satellite of said one or more satellite positioning system satellites.

10. The method of claim 9 wherein said communication unit and said satellite positioning system receiver are integrated in one enclosure.

11. An apparatus comprising:
a satellite positioning system receiver operable to receive and process satellite positioning system signals from a plurality of satellite positioning system satellites, said satellite positioning system receiver comprising;
a receiver circuit coupled to a satellite processing system antenna; and
a communication unit operable to transmit data over a communication link, said communication unit comprising;
an output amplifier operable to transmit data from said communication unit, and
a control device coupled to said output amplifier and to said satellite positioning system receiver, said control device operable to control processing of satellite positioning system signals in said satellite positioning system receiver in accordance with a power level of said output amplification.

12. The apparatus of claim 11 wherein
said control device is operable to control said power level of said output amplifier; and
said output amplifier is operable to transmit said data at a first power level, and to maintain power at a second power level, said first power level being higher than said second power level; and wherein said control device transmits a first control signal state to cause said output amplifier to transmit data at said first power level, and transmits a second control level state to cause said output amplifier to maintain power at said second power level.

13. The apparatus of claim 1 wherein said first control signal state causes said satellite positioning system receiver to disable processing of satellite positioning system signals incident on said satellite positioning system antenna.

14. The apparatus of claim 13 wherein said control device is coupled to a switch, said switch being further coupled between said satellite positioning system antenna and said receiver circuit, and wherein said first control signal state causes said switch to open thereby blocking reception of satellite data in said satellite positioning system receiver.

15. The apparatus of claim 13 further comprising a signal processing circuit coupled to said receiving circuit, and a first processor coupled to said signal processing circuit; wherein said control device is coupled to said first processor, and wherein said first control signal state causes said first processor to disregard satellite positioning system signals received by said receiver circuit.

16. The apparatus of claim 14 wherein said switch is a Gallium Arsenide switch.

17. The apparatus of claim 13 wherein said communication unit is a cell based transceiver, and said communication signal is a cellular telephone signal.

18. The method of claim 17 wherein said satellite positioning signals include data specifying at least one pseudo-range for a corresponding satellite of said one or more satellite positioning system satellites.

19. The method of claim 18 wherein said communication unit and said satellite positioning system receiver are integrated in one enclosure.

20. The method of claim 13 wherein said first processor and said control device are contained within a single digital processor shared between said communication unit and said satellite positioning system receiver.

* * * * *